(No Model.) 2 Sheets—Sheet 1.

Z. T. FURBISH.
RATCHET TOOL.

No. 597,766. Patented Jan. 25, 1898.

Witnesses:
Walter T. Camp
Marion Richards

Inventor.
Zachary T. Furbish
by
Verrill & Clifford,
Attys.

(No Model.) 2 Sheets—Sheet 2.

Z. T. FURBISH.
RATCHET TOOL.

No. 597,766. Patented Jan. 25, 1898.

Witnesses:
Walter S. Camp
Marion Richards

Inventor.
Zachary T. Furbish
by
Verrill & Clifford,
Attys.

UNITED STATES PATENT OFFICE.

ZACHRY T. FURBISH, OF PORTLAND, MAINE, ASSIGNOR, BY MESNE ASSIGNMENTS, TO THE NORTH BROTHERS MANUFACTURING COMPANY, OF PHILADELPHIA, PENNSYLVANIA.

RATCHET-TOOL.

SPECIFICATION forming part of Letters Patent No. 597,766, dated January 25, 1898.

Application filed March 8, 1897. Serial No. 626,391. (No model.)

*To all whom it may concern:*

Be it known that I, ZACHRY T. FURBISH, a citizen of the United States of America, residing at Portland, in the county of Cumberland and State of Maine, have invented certain new and useful Improvements in Ratchet-Tools; and I do hereby declare the following to be a full, clear, and exact description of the invention, such as will enable others skilled in the art to which it appertains to make and use the same.

My invention relates to improvements in screw-drivers, drills, augers, &c. It is designed to operate said tools by a straight push without the rotation of the handle, to enable the spindle which carries the tool to be withdrawn from the handle without rotation of either part, to render such tool capable of being rotated in either direction, to provide a convenient chuck for removably securing the screw-driver blade or other tool to the spindle, and to lock the spindle to the handle to prevent rotation in either direction.

Figure 1:
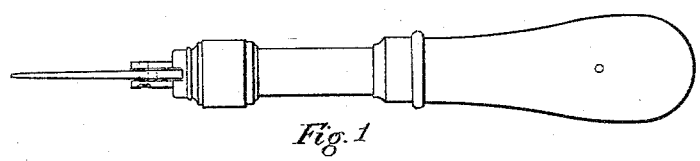
Figure 2:
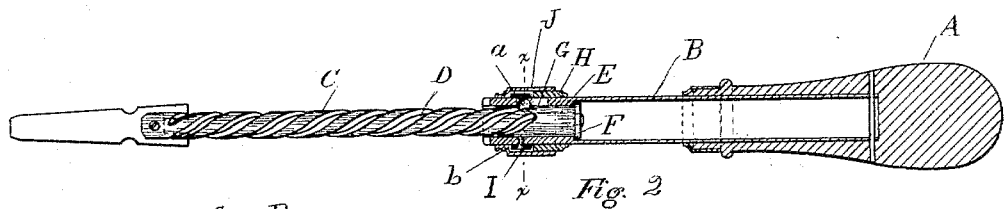
Figure 3:
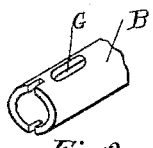
Figure 4:
Figure 5:
Figure 6:
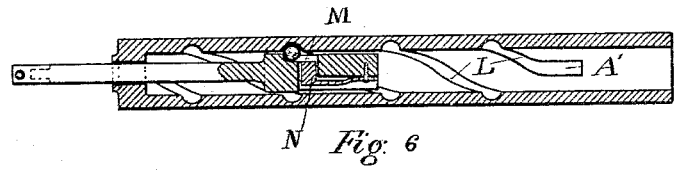
Figure 7:
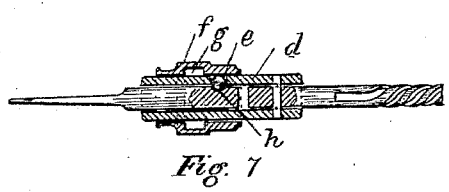
Figure 8:
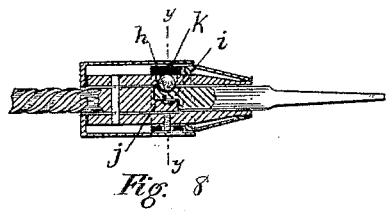
Figure 9:
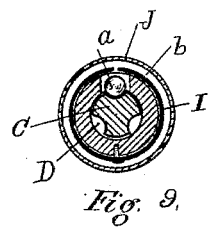
Figure 10:
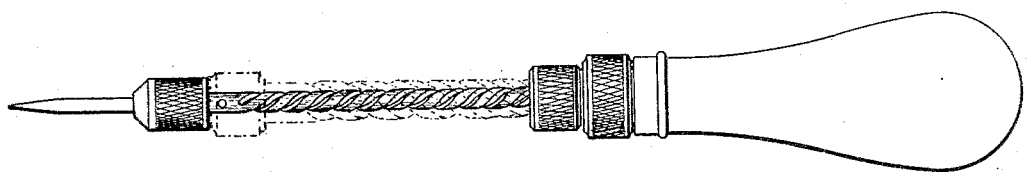
Figure 11:
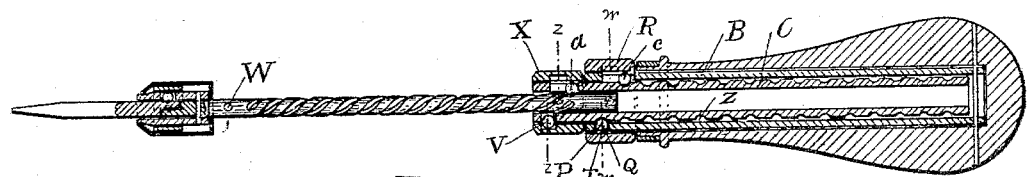
Figure 12:
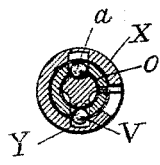
Figure 13:
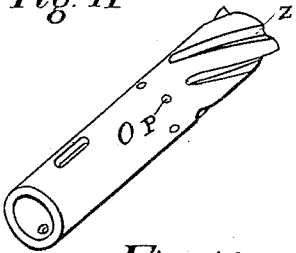
Figure 14:
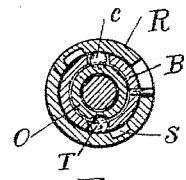

In the drawings herewith accompanying and making a part of this application, Figure 1 is an elevation of my improved tool, the spindle being closed and provided with a screw-driver blade. Fig. 2 is a central sectional view of the same, the spindle being extended. Fig. 3 is a perspective detail view of the end of the handle, showing slot in top and sockets in the end. Fig. 4 is a sectional view of Fig. 8, taken on line *y y*. Fig. 5 is a detail plan view of a portion of the spindle shown in Fig. 6. Fig. 6 is a central sectional view of a handle and spindle in which the spiral grooves are in the tube instead of on the spindle. Fig. 7 is a sectional view of a clutch, showing a locking-sleeve adapted to slide horizontally. Fig. 8 is a sectional view of a clutch, showing a locking-sleeve adapted to rotate. Fig. 9 is a sectional view of Fig. 2, taken on line *x x*. Fig. 10 is an elevation of my improved device adapted to have both a right and left end movement. Fig. 11 is a central sectional view of the same. Fig. 12 is a cross-sectional view taken on line *z z*, Fig. 11. Fig. 13 is a detail perspective view of the tubular spindle; and Fig. 14 is a cross-sectional view taken on line *w w*, Fig. 11.

Same letters refer to like or corresponding parts.

In said drawings, A represents a hollow handle, in which is a spindle containing tube B. Mounted in said tube is a spindle C, provided with circumferential spiral grooves D and on the inner end with a flange E, adapted to engage an interior flange F at the outer end of said tube when the spindle is extended as in Fig. 2. The tube has a slot G near the end thereof and a ring-flange H overhanging a portion of said slot. A small ball *a* is placed in said slot and allowed to fall into a groove in the spindle. The open portion of said slot is covered by a divided spring-band I, and over the whole is a sleeve J, having an annular groove *b*, somewhat deeper than the thickness of the band.

In operation, when constructed as shown in Fig. 2, the spindle is first withdrawn into the position shown in Fig. 2. The handle is then pushed down, and the ball, passing back in the slot under the flange H, is held in a fixed position by said flange and the sides of the slot. The ball being prevented from leaving the groove in the spindle, it follows that the spindle must rotate as the handle is pushed forward. On the other hand, when the spindle is being withdrawn from the tube the ball is first drawn down into the position shown in Fig. 2, where it is free to press aside the yielding spring-band and to ascend in the slot until it is out of engagement with the spindle, thus allowing the spindle to be withdrawn from the tube without rotation. The same principle is involved in the structure shown in Fig. 6, in which the spiral grooves are in the interior wall of the tube and the slot is in the spindle.

In Fig. 6, L represents spiral grooves in the interior of the tube, M a slot or recess in the spindle, and N a spring inserted in the deeper part of the slot. The operation is substantially the same as that of the form shown in Fig. 2. When withdrawing the spindle from the tube preparatory to using, the ball first passes back to a point adjacent to the spring, which, yielding, allows it to pass out of the spiral groove, and thus permits the spindle to be drawn out of the tube without rotation, as before. When in use, the ball moves forward in the slot in the spindle to the position shown in Fig. 6, and is thus held in the groove, and consequently causes the spindle to rotate as the tube is pushed on the spindle.

If it be desired to give both a right and left rotation to the spindle by a push movement, it may be accomplished by the structure shown in Figs. 10 and 11, the principle involved being substantially the same. In this case a supplemental tube O is used and means employed for locking tube O to tube B and for locking tube O to the spindle. To lock tube O to tube B, I make a hole P in the outside of tube O and a slot Q in tube B, adapted to register therewith. Encircling tube B at a point over slot Q is a locking-sleeve R, having a recess S, which may be rotated to register with said hole and slot. In the slot is inserted a ball-lock T. When the sleeve is turned to the position shown in Fig. 14, the ball is held down in said indent and hole, thereby locking the tube O against rotation. When the sleeve is turned so that recess S registers with said socket and hole, the ball T may pass up out of said hole into said recess and permit the tube O to turn in tube B. Now when tubes B and O are thus locked the spindle is given the usual right-hand rotation in tube O by means of the ball $a$ traveling in the spiral groove in said spindle, the operation being substantially the same as that of the spindle in Fig. 2, the position of the ball $a$ in the slot being that which it occupies when the handle is being pushed. Now when it is desired to reverse the motion of the spindle the tube O is unlocked from tube B and the tube O drawn out of tube B into the position shown in dotted lines in Fig. 10. The ball V will enter the hole W in the spindle, and the sleeve X, being turned, will lock the spindle and tube O together. The handle is then pushed down, and ball $c$, traveling in the reversely-threaded groove Z of tube O, causes the spindle and tube to rotate to the left hand. It will be seen that this construction permits either the spindle to be withdrawn from tube O or the spindle and tube O to be withdrawn from tube B without rotation, substantially the same as the spindle is withdrawn in Fig. 2.

It is often desirable to lock the spindle against rotation in either direction, in which case the tool is used as an ordinary fixed screw-driver. To permit this, I extend the spiral grooves at the inner end for some distance in a direction parallel to the tube or to the spindle, as the case may be, as seen at A' in Figs. 6 and 7. Thus when the ball passes into this portion of said groove it will be evident that the spindle cannot be turned in either direction.

In devices of this kind adapted to be employed with tools of various kinds it is important to have a clutch from and to which the tool proper, as screw-driver, auger, or drill, may be quickly removable and secured. For this purpose I have invented a device (illustrated in Figs. 7 and 8) which consists in securing to the end of the spindle a sleeve $d$, which projects somewhat beyond the end thereof. In said sleeve is a hole $e$, and around said sleeve is a removable sleeve $f$, having an interior circumferential groove $g$ therein, said last-named sleeve being adapted to be moved to bring said groove over the hole in the inner sleeve. In the outside of the tool is a small indent $h$, adapted to register, when the tool is in place in the sleeve, with the hole in the inner sleeve and, when desired, with the groove in the outer sleeve. In Fig. 8 a modification of this structure is shown, which consists in making a revoluble instead of sliding outer sleeve and in scarfing the meeting ends of the spindle, as seen at $i$ and $j$. The socket in the inner tube is covered with a spring K, which yields to permit the ball to rise out of the indent in the tool to permit the tool to be withdrawn from the inner sleeve.

The operation of my improved device has been hereinbefore described. Its advantages are that the spindle may be withdrawn from the handle without rotation, the ball which acts in the groove to rotate the spindle rising out of the groove, so as to permit it to pass over the projection formed by the groove.

The construction shown in Figs. 6 and 7 permits the spindle to be locked to the handle against rotation in either direction when the tool is closed.

The advantages of the construction shown in Figs. 10 and 11 are that by a very simple change the spindle may be caused to rotate in either direction.

Having thus described my invention and its use, I claim—

1. The combination with a hollow handle having a slot near the outer end, of a spirally-grooved spindle, a ball in said slot adapted to extend down into one of the grooves in the spindle and a sleeve having a recess therein movable on said handle to bring said recess either into or out of register with said slot, substantially as and for the purposes set forth.

2. The combination with a hollow handle having a slot near the outer end, of a spindle provided with spiral grooves terminating at the inner end in straight grooves parallel with the length of the spindle, a ball in said slot adapted to extend down into one of the grooves and a sleeve having a recess therein, said sleeve being movable on said handle to bring said recess either into or out of register with said slot, substantially as and for the purposes set forth.

3. The combination with a hollow handle having sockets in the end and a slot near the end, of a spirally-grooved spindle provided with a tool having shoulders adapted to enter said sockets and lock the spindle to the handle, a ball in said slot adapted to extend down into one of the grooves in the spindle and a sleeve having a recess therein, said sleeve being movable on said handle to bring said recess either into or out of engagement with said slot, substantially as and for the purposes set forth.

4. In combination, a hollow tube and spindle mounted therein, one provided with spiral grooves and the other with a slot, a ball in the slot adapted to extend into and travel in one of said grooves and means for normally retaining the ball in the groove but constructed and arranged so as to be capable of permitting the ball to rise out of the groove when the spindle is being withdrawn from the tube, substantially as and for the purposes set forth.

5. In combination, a tubular handle having a slot and hole near the outer end, a tube mounted therein provided with spiral grooves on the outside and a slot, hole and indent near the outer end, a spindle provided with reversely-threaded spiral grooves and an indent near the outer end, a sleeve on the handle having recesses therein, said sleeve being movable to cause said recesses to register with said slot and hole in the handle, balls in said slot and hole in the handle, a sleeve on the tube provided with recesses, said sleeve being movable to cause said recesses to register with said slot and hole in the tube and balls in said slot and hole in the tube, substantially as and for the purposes set forth.

6. In combination, a spindle terminating in a scarfed end, a tubular case surrounding and secured to the end of the spindle, a tool having a corresponding scarfed end and an indent therein, a hole in said case adapted to register with the indent in the tool when the tool is inserted therein, a ball in said hole and a sleeve surrounding said case and having a recess therein, said sleeve being movable on said case to cause said recess to register with said hole, substantially as and for the purposes set forth.

In testimony whereof I affix my signature, in presence of two witnesses, this 15th day of February, 1897.

ZACHRY T. FURBISH.

Witnesses:
ELGIN C. VERRILL,
NATHAN CLIFFORD.